United States Patent
Cassel

(10) Patent No.: US 9,576,307 B2
(45) Date of Patent: Feb. 21, 2017

(54) METHOD AND APPARATUS FOR CONTROLLING CHARGING OF A SERVICE

(75) Inventor: Joel Cassel, Rodeby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/115,796

(22) PCT Filed: May 5, 2011

(86) PCT No.: PCT/SE2011/050566
§ 371 (c)(1),
(2), (4) Date: Nov. 5, 2013

(87) PCT Pub. No.: WO2012/150885
PCT Pub. Date: Nov. 8, 2012

(65) Prior Publication Data
US 2014/0108212 A1    Apr. 17, 2014

(51) Int. Cl.
G07B 17/00    (2006.01)
G07F 19/00    (2006.01)
G06Q 30/04    (2012.01)
H04M 15/00    (2006.01)

(52) U.S. Cl.
CPC .............. *G06Q 30/04* (2013.01); *H04M 15/60* (2013.01); *H04M 15/8027* (2013.01); *H04M 2215/22* (2013.01)

(58) Field of Classification Search
None
See application file for complete search history.

(56) References Cited

U.S. PATENT DOCUMENTS

| | | | | |
|---|---|---|---|---|
| 8,452,872 | B2 * | 5/2013 | Castro Castro et al. | 709/224 |
| 8,483,057 | B2 * | 7/2013 | Cuervo | 370/230 |
| 8,730,823 | B2 * | 5/2014 | Mohammed et al. | 370/242 |

(Continued)

FOREIGN PATENT DOCUMENTS

WO    2011020498 A1    2/2011

OTHER PUBLICATIONS

3rd Generation Partnership Project; Technical Specification Group Services and System Aspects; Telecommunication management; Charging management; Diameter charging applications (Release 10), 3GPP Standard; 3GPP TS 32.299 V10.1.0, 2011, 148 pages.

*Primary Examiner* — Fateh M Obaid
(74) *Attorney, Agent, or Firm* — Rothwell, Figg, Ernst & Manbeck, P.C.

(57) ABSTRACT

A method and apparatus for controlling charging of a service in a communication network comprising in an Online Charging System OCS receiving a request message for charging of the service from a charging client where the request message is including at least data identifying a first communication network account to charge for the service. A system utilization indicator is accessed representing a computer resource utilization value of a node involved in providing the service. Based on at least the system utilization indicator a determined service usage quota is determined, including a determined service usage quota attribute, to be reserved for from the account. The service usage quota is reserved for from the account and an answer message is transmitted to the charging client including the determined service usage quota attribute of the service usage quota reserved for from the account to be applied in controlling the service.

18 Claims, 6 Drawing Sheets

(56) References Cited

U.S. PATENT DOCUMENTS

| | | | |
|---|---|---|---|
| 2009/0217326 A1* | 8/2009 | Hasek | 725/87 |
| 2011/0040663 A1* | 2/2011 | Cai et al. | 705/30 |
| 2011/0067085 A1* | 3/2011 | Brouard et al. | 726/1 |
| 2011/0320323 A1* | 12/2011 | Cuervo | 705/30 |
| 2012/0117235 A1* | 5/2012 | Castro Castro et al. | 709/224 |
| 2012/0198058 A1* | 8/2012 | Pogorelik et al. | 709/224 |
| 2012/0327813 A1* | 12/2012 | Mohammed et al. | 370/259 |
| 2013/0003529 A1* | 1/2013 | Lopez Nieto et al. | 370/221 |
| 2014/0242943 A1* | 8/2014 | Mohammed et al. | 455/406 |

\* cited by examiner

METHOD AND APPARATUS FOR CONTROLLING CHARGING OF A SERVICE

CROSS REFERENCE TO RELATED APPLICATION(S)

This application is a 35 U.S.C. §371 National Phase Entry Application from PCT/SE2011/050566, filed May 5, 2011, designating the United States, the disclosure of which is incorporated herein in its entirety by reference.

FIELD OF INVENTION

The present invention relates to a method and apparatus for controlling charging of services in a communication network.

BACKGROUND

Operators of communication networks face a challenge in how to secure mobile broadband revenues.

The tremendous uptake in mobile broadband subscribers and data volume will require substantial investments in operators' telecom infrastructure. On the other hand, users will expect their operator to deliver the service experience they have paid for. Thus, operator revenues from mobile broadband rely on satisfied customers.

A small fraction of the users generates traffic exceeding those of normal users with magnitude. In many networks, these heavy users are consuming a quite large part of the network resources today. Experience shows that heavy users normally constitutes of 5-10% of the total subscribers, but could consume 70-85% of the network resources. It has been shown that often the heavy users are the biggest consumers of the network resources also during busy hour.

However, operators need to secure there investments in communications infrastructure by safeguarding their revenue by limiting their credit risks.

Operators limit their credit risk by using real time charging systems wherein authorization of services is continuously under surveillance of the charging system.

Irrespective of whether a subscriber is given a zero credit limit thereby having to prepay for their services, or are allowed a non-zero credit limit to be paid after the service is rendered, e.g. via a monthly bill, real time charging is used to secure that subscriber cannot exceed its allowed credit limit.

For similar reasons end users expect control over their charges and demands an equally safe control over their spending.

Today and in the future, operators are introducing new premium services, for example ring tones download, TV, video streaming, VoIP, etc. To make sure that the subscribers get the best end user experience while consuming these premium services real time charging is used to safeguard operator credit risk and end user spending control while these services are when being accessed.

In order to handle charging control coping with the increased need for real time credit control, the 3rd Generation Partnership Project 3GPP has in TS 32.299 V10.1.0 (2011-03) specified a Diameter based offline and online charging applications for 3GPP networks. The offline charging mechanism is where charging information does not affect, in real-time, the service rendered. In contrast, online charging is the charging mechanism where charging information can affect, in real-time, the service rendered and therefore a direct interaction of the charging mechanism with session/service control is required.

However, a problem with the charging architecture as defined by 3GPP is that it does not provide a mechanism to handle the increased signaling and load on the communication network when the number of requests in a given time interval increases due to higher demands on accuracy, more frequent users and/or increasing number of services often used in parallel.

SUMMARY OF INVENTION

An object of the invention is to provide a method and apparatus for controlling charging of a service in a communication network mitigating the increased signaling and load on the communication network when the number of requests in a given time interval increases due to higher demands on accuracy, more frequent users and/or increasing number of services often used in parallel.

The invention relates to a method performed by an Online Charging System OCS for controlling charging of a service in a communication network comprising the steps of receiving a request message for charging of the service from a charging client where the request message is including at least data identifying a first communication network account to charge for the service. A system utilization indicator is accessed representing a computer resource utilization value of a node involved in providing the service. Based on at least the system utilization indicator a determined service usage quota is determined, including a determined service usage quota attribute, to be reserved for from the account. The service usage quota is reserved for from the account and an answer message is transmitted to the charging client including the determined service usage quota attribute of the service usage quota reserved for from the account to be applied in controlling the service.

An advantage of the invention is the lower hardware and network capacity need for the communication network during traffic peaks. It will also be possible to increase the network signaling during low network usage. A further advantage is that the network will be less likely to reject traffic due to system load.

Another aspect of the invention relates to an online credit control system OCS for controlling charging of a service in a communication network comprising an interface unit adapting the OCS for receiving a request message for charging of the service from a charging client. The request message is including at least data identifying a first communication network account to charge for the service. The OCS also comprises a determination unit adapting the OCS for:

(i) accessing a system utilization indicator representing a computer resource utilization value of a node involved in providing the service;
(ii) determining based on at least the system utilization indicator a determined service usage quota, including a determined service usage quota attribute, to be reserved for from the account; and
(iii) reserving for the service usage quota from the account. The interface unit is further adapting the OCS for transmitting an answer message to the charging client including the determined service usage quota attribute of the service usage quota reserved for from the account to be applied in controlling the service.

Embodiments of the invention will now be described in more detail with reference to the enclosed drawings.

DETAILED DESCRIPTION OF THE INVENTION

Figure 1:
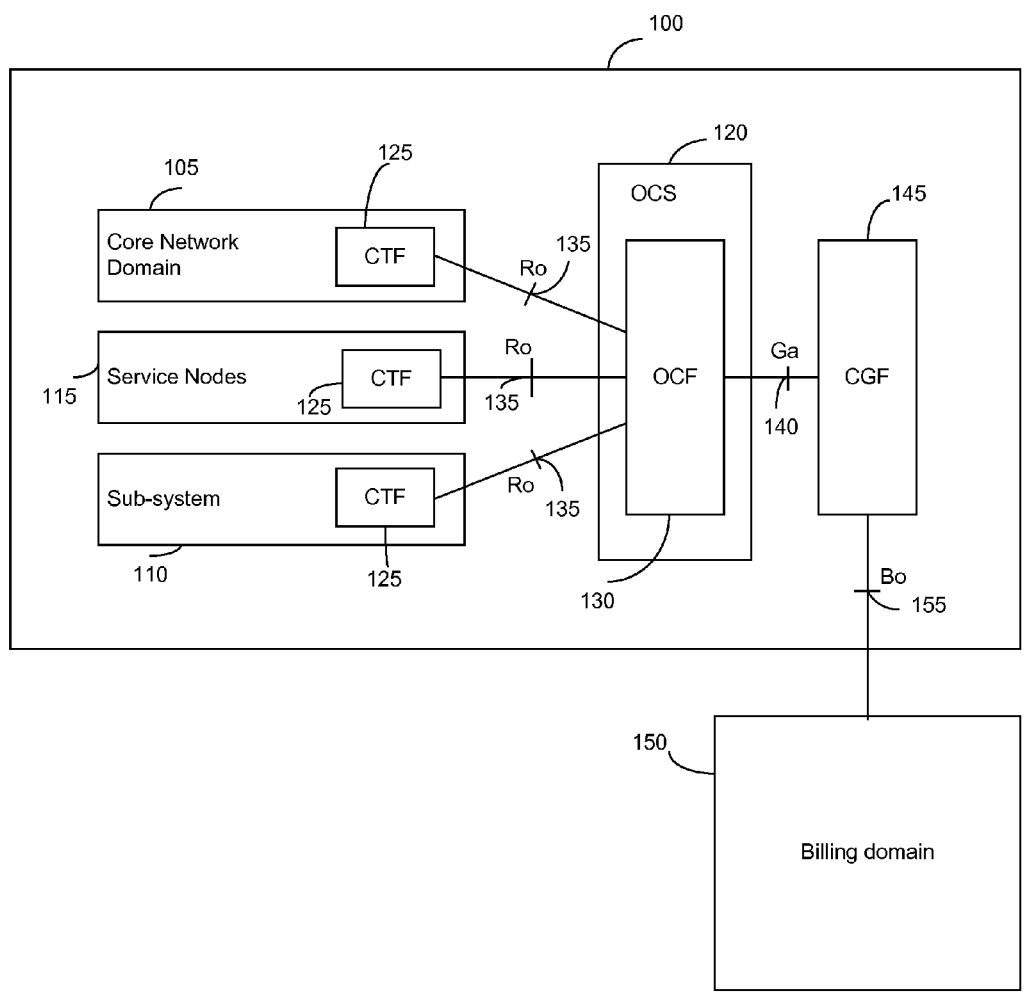
FIG. 1 is a block diagram showing an example online charging architecture wherein the invention is useful.

The following detailed description of the exemplary embodiments refers to the accompanying drawings. The same reference numbers in different drawings identify the same or similar elements. Also, the following detailed description does not limit the invention. Instead, the scope of the invention is defined by the appended claims. FIG. 1 is a block diagram showing an example online charging architecture wherein the invention is useful.

A Communication network 100 provides functions that implement online charging mechanisms as charging clients in charging trigger functions CTF of Network Elements NE on the core network 105 (e.g. Evolved Packet Core EPC), subsystem 110 (e.g. IP Multimedia Subsystem IMS) and service 115 (e.g. Multimedia Messaging System MMS) levels. In order to support these charging mechanisms, the network performs real-time monitoring of required network resource usage on the above three levels in order to detect the relevant chargeable events.

In online charging, a subscriber account, located in an Online Charging System OCS 120, is queried prior to granting permission to use the requested network resource(s).

Typical examples of network resource usage are a voice call of certain duration, the transport of a certain volume of data, or the submission of a multimedia message of a certain size. The network resource usage requests may be initiated by a User Equipment UE or by the network.

Online charging is a process where charging information for network resource usage is collected concurrently with that resource usage. However, authorization for the network resource usage is obtained by the network prior to the actual resource usage occurs. This authorization is granted by the Online Charging System upon request from the network.

When receiving a network resource usage request the Charging Trigger Function CTF 125 of the network assembles the relevant charging information and generates a charging event towards the Online Charging Function OCF 130 of the OCS in real-time. The OCS then returns an appropriate resource usage authorization. The resource usage authorization may be limited in its scope (e.g. quota of volume of data or duration), therefore the authorization may have to be renewed from time to time as long as the network resource usage persists.

The charging events are forwarded to the OCF in order to obtain authorization including a service usage quota for the chargeable event/network resource usage requested by the UE or network. The CTF is also able to track the availability of resource usage permission ("quota supervision") during the network resource usage.

Online charging in the Circuit Switched CS and Packet Switched PS domains may also be performed using the Customized Applications for Mobile networks Enhanced Logic CAMEL Application Part CAP protocol and the CAP reference point from the Mobile Switching Centre MSC and Serving GPRS Support Node SGSN, respectively, to the Online Charging Function. Other network elements may employ the Ro reference point 235 for online charging using Diameter Credit Control application. Similarly, Wo reference point may be employed for Wireless Local Area Network WLAN and a Gy reference point may be employed for Policy and Charging Control PCC.

The Ro reference point from the Charging Trigger Function CTF 125 to the Online Charging Function OCF 130 is intended for the transport of charging events for online charging. The Ga 140 reference point is the interface between the OCF and the Charging Gateway Function CGF 145 which connects the Billing Domain BD 150 over the Bo 155 reference point.

The Ro reference point supports interaction between a Charging Trigger Function and an Online Charging Function. The following information may flow across this reference point:

Charging events for online charging from the CTF to the OCF.

Receive Acknowledgements for these charging events from the OCF to the CTF. The acknowledgement grants or rejects the network resource usage requested in the charging event, according to the decision taken by the OCS.

The CAP reference point provides similar functionality for online charging as Ro, however, it is based on CAMEL techniques.

Different mappings of the online charging functions, CTF, OCF and CGF, onto physical implementations are possible.

Figure 2:
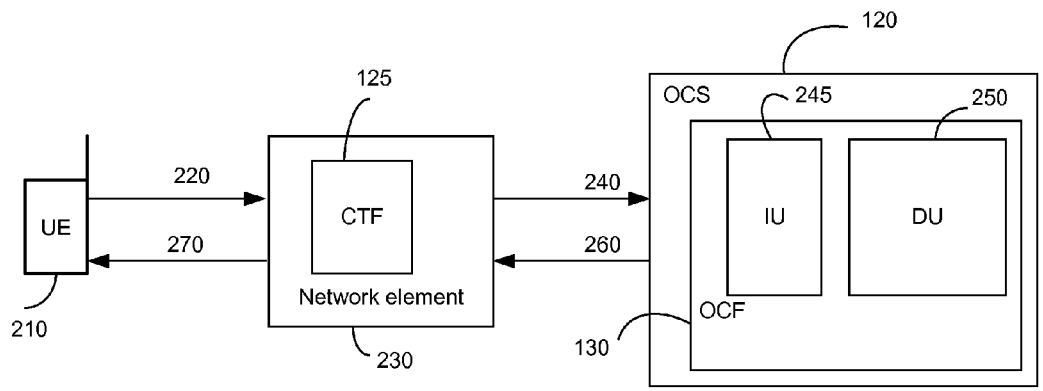
FIG. 2 is a block diagram showing the controlling of charging of services according to an exemplary embodiment of the invention.

Each CTF may have an OCF address list to which it can send its charging events and/or charging requests. FIG. 2 is a block diagram showing the controlling charging of services according to an exemplary embodiment of the invention.

The requesting node, for example User Equipment UE 210 sets up a session with the network element NE 230 and asks for a quota of X units of service usage (request X) in message 220 to start e.g. a telephony call.

A CTF 125 in the NE sends a credit control request for charging of a service including data identifying an account to charge for the service to an OCF 130 of an OCS 120 in step 240 asking for the X units of service usage. In another example no units of service usage is specified in the request. The network elements, one or many, involved in providing the service may have the ability to append its computer resource utilization value to the request. (request X, optionally appending a system utilization indicator). The request 240 is received by an Interface Unit IU 245.

A system utilization indicator representing the computer resource utilization value, either gathered from the request or based on local system/server measuring points is evaluated by a Determination Unit DU 250 of the OCF 230. If the computer resource utilization is above a pre-configured threshold the requested quota is modified by a pre-determined modification factor Y (i.e. reserve funds for f(X,Y) from account).

Thus, by altering the quota based on computer resource utilization in the OCS and/or an NE it will be possible to alter the network system performance for varying network load.

Computer resource utilization may be number of requests received per time unit e.g. calls per second, CPU usage, power consumption, a degree of physical hardware failures or warnings, pre-reported utilization based on earlier measurements of e.g. traffic, real-time network reported load, memory usage, database need etc.

The OCS will determine a modified attribute of the quota of service usage when any involved NE is affected by a computer resource utilization deviating from a threshold value. Thereby a default service usage quota attribute of units that are normally pre-configured in the communication network may be increased during heavy load, or decreased during low load. The service usage quota attribute may be for example number of units or a service usage quota validity time.

In step 260 a response message from the OCS towards the requesting NE is sent giving the service usage quota modified by the pre-determined factor Y (i.e. grant f(X,Y)). The response to the NE will contain a service usage quota to use other than the originally requested X units and the network element waits with any signaling until the total f(X,Y) units has passed, are consumed, or the session is ended.

The requested service will be delivered to the UE under surveillance of the CTF 125 in step 270, ensuring that the received service usage quota is not exceeded.

In one example scenario the network element 230 is a Gateway GPRS Support Node GGSN. During a high-profile football event the GGSN for a network operator is beginning to reach its capacity peak. All IP-TV data sessions generated by user equipments 210 connected to the GGSN is causing extensive network signaling and a system load of say 95%. If additional system load is received the GGSN may be forced to start throttling the requests.

For this example, the normal data sessions use a service usage quota size of 500 kb and a requested validity time of 10 minutes (i.e. the time window during which a received quota is valid).

In this example scenario the GGSN appends a system utilization indicator to the charging protocol (for instance the Diameter charging) for each request 240 towards the OCS. The system utilization indicator is reflecting the load level that is current on the GGSN.

The DU 250 receives the request for session usage of 500 kb during a maximum of 10 minutes.

The system utilization indicator is evaluated and based on previous configuration the value is determined to be too high. The requested units (500 kb) are altered before any account reservation is made. A check may be made if the account allows system utilization based service usage quota. The factor for reservations is then set to for instance 10.

The DU when performing rating based reservation on the account will try to reserve funds for a service usage quota of 5000 kb (500 kb*10). The DU will also grant the response to be valid for 100 minutes (10 min*10), using the validity time. As alternatives, the DU may either reserve funds for the modified service usage quota or modify the validity time.

The effect of the modified service usage quota is that the GGSN does not need to report to the OCS 120 until all 5000 kb are used up (or in 100 minutes), this will cause the system network signaling to decrease.

The determination of whether the account allows system load based quotas can be determined based on available account balance, subscription type, convergence, subscriber status, offerings etc.

In another example scenario the network element 230 is a Mobile Switching Centre MSC. During the Thanksgiving weekend the networks for several operators are at a high load during late afternoon due to many people calling home. In this case the system that is the bottle-neck is the OCS 120.

In this example the MSC will request to get 60 seconds of voice coverage in step 240. The OCS receives the request for voice service during 60 seconds. The OCS internal calls per second parameter is determined to be at 80%. A pre-set configuration will then use the factor 1.5 on all subscribers whereby the rating based reservation on the account will try to reserve funds for 90 seconds. If funds are available it will also grant 90 seconds instead of 60. This will cause that the MSC does not need to report back to the OCS until after 90 seconds or if the session ends. For long lasting calls this will then cause a decrease in signaling towards the OCS by a factor of 1.5.

As yet another example scenario, at a normal Tuesday weekend night between 4 and 5 am the network is only utilized at a 5% level. By monitoring the network usage during a normal week it is determined that this is always a "low", this time is then configured to alter the reservations.

In this traffic example all traffic received by the DU 250 is evaluated and the time of the day (4-5 am) gives a factor of 0.5. All requests of voice traffic type are decreased by 50%. This means that a voice reservation for 60 s will be granted 30 s (60 s*0.5).

Figure 3:
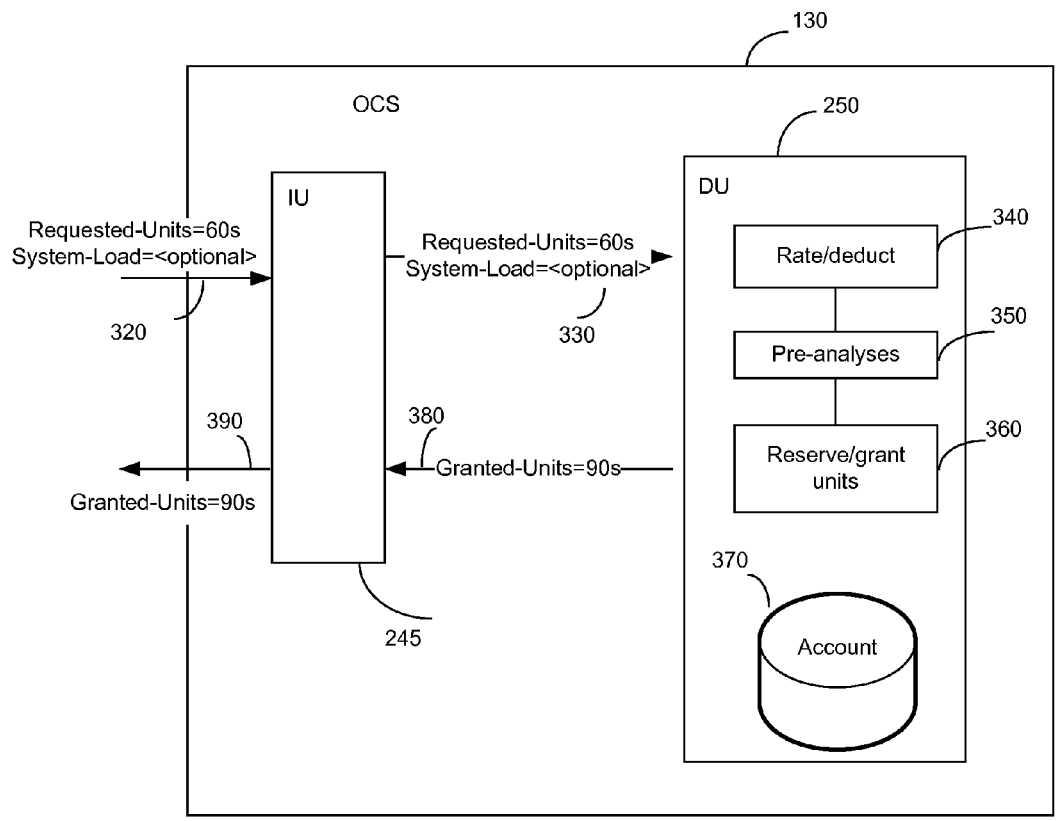
FIG. 3 is a block diagram showing the working of the OCS according to an exemplary embodiment of the invention.

Decreasing the quotas will give the effect that the there will be a closer granularity session control and in-traffic notifications, i.e. more accurate, towards the user equipment. FIG. 3 is a block diagram showing the working of the OCS according to an exemplary embodiment of the invention.

The OCF 130 contains an Interface Module IU 245 and a Determination Unit DU 250. Requested units of service usage are modified based on requesting network, IU or DU computer resource utilization. The modifying factor is determined using service determination logic in the DU.

In step 320 a Requested-Units=60 s and optionally a System-Load parameter is received by the IU from the CTF of a requesting NE. If the request is an intermediate request it may included an amount of used units granted in previous requests. The IU determines the appropriate DU and routes the Requested-Units=60 s, any received system utilization indicator, an optional IU-system utilization indicator and any used units to the DU in step 330. In step 340 an account to charge for the service is identified using data received in the request, a rating of the requested service is done, and funds for any used units are deducted from the account in the account database 370.

In step 350 a pre-analysis and service determination is done using a system utilization indicator either received in the request 330, or otherwise available to the DU, e.g. as a DU system load value, to determine a modification factor for use in modifying the requested units value. In this example a modification factor of 1.5 is determined In step 360 the DU tries to reserve funds for the requested units modified with the modification factor (i.e. 1.5*60 s= 90 s) from the account.

Figure 4:
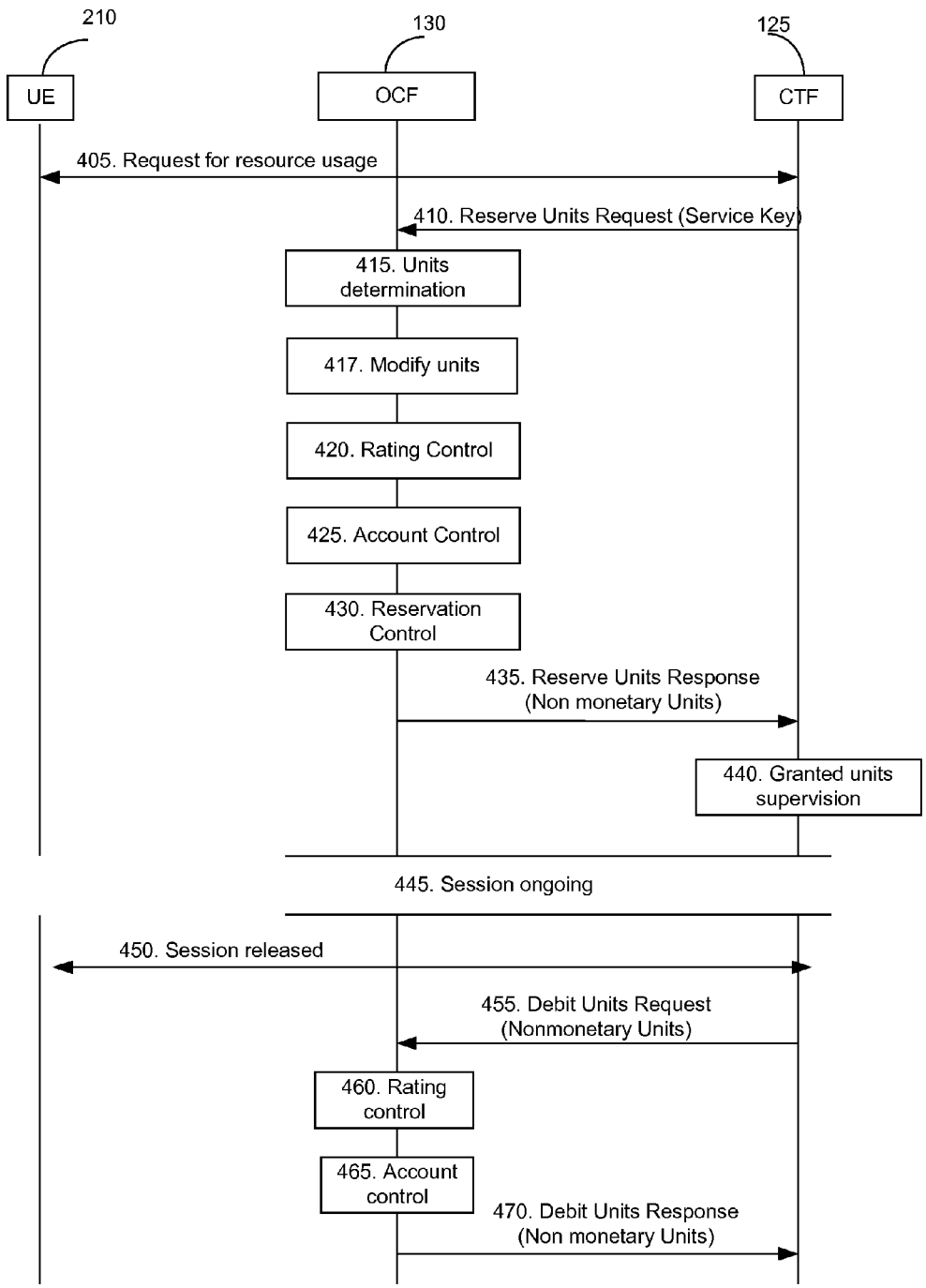
FIG. 4 is a message sequence chart showing session charging with reservation/centralized unit determination and centralized rating using the invention according an exemplary embodiment of the invention.

If the reservation is successful the DU will return an answer message to the IU in step 380 granting 90 seconds usage as units. The IU will return the granted units to the CTF of the requesting node in step 390. FIG. 4 is a message sequence chart showing session charging with reservation/centralized unit determination and centralized rating using the invention according an exemplary embodiment of the invention.

There are two sub-functions for online charging that affect online charging: rating and unit determination. Both rating and unit determination can be implemented centralized, i.e. on the OCF, or decentralized, that is, on the CTF.

Unit determination refers to the calculation of the number of non-monetary units (service units, data volume, time and events) that shall be assigned prior to starting service delivery. With Centralized Unit Determination, the OCF determines the number of non-monetary units that a certain service user can consume based on a service identifier received from the CTF. With the Decentralized Unit Determination approach, the CTF determines itself how many units are required to start service delivery, and requests these units from the OCF.

After checking a service user's account balance, the OCF returns the number of granted units to the CTF. The CTF is then responsible for the supervision of service delivery. Particularly, the CTF limits service delivery to the corresponding number of granted units.

Rating refers to the calculation of a price out of the non-monetary units calculated by the unit determination function.

With the Centralized Rating approach, the CTF and the OCF exchange information about non-monetary units. The OCF translates these units into monetary units.

In the following scenario session charging with reservation/centralized unit determination and centralized rating is shown, wherein the CTF requests the OCF to reserve units based on the session identifiers specified by the CTF. An account debit operation is carried out following the conclusion of session.

In step 405 a Request for resource usage message is received wherein the User Equipment UE 210 requests a session establishment from the CTF 125.

A Reserve Units Request message is sent from the CTF to the OCF 130 in step 410 which may include a system utilization indicator. Depending on the requested type of the session by the UE, the CTF selects a service key and forwards the Reserve Units Request to the OCF.

In step 415 a Units Determination is done wherein the OCF determines the number of non-monetary units needed for the content/service delivery, based on the received service key. The determination can be done using set of selection rules e.g. a selection trees whereby the non-monetary units needed are determined by traversing the selection rules. In another possible implementation a table is used defining the number of non-monetary units needed for each service key.

In step 417 a system utilization indicator is accessed and the number of non-monetary units is modified based on the system utilization value.

In step 420 Rating Control is done. Assisted by a rating entity the OCF calculates the number of monetary units that represent the price for the number of units determined in step 417.

In step 425 the account is controlled wherein the OCF checks whether the user's account balance is sufficient for the price calculated in step 420.

In the Reservation Control of step 430 a reservation is made towards the user account for the calculated price in step 420.

A Reserve Units Response message is sent from the OCF to the CTF in step 435. The OCF informs the CTF of the reserved number of units for which a balance is reserved for on the user's account. This includes the case where the number of units reserved indicates the permission to render the service that was identified by the received service key.

In step 440 the granted units are supervised. Simultaneously with the ongoing session, the CTF monitors the consumption of the reserved units.

The session is ongoing in step 445 wherein the CTF maintains the session. One or more debit and reserve operations may be performed when the session is ongoing.

In step 450 the session is released.

A Debit Units Request is sent from the CTF to the OCS in step 455. The CTF requests the OCF to assure the deduction of an amount corresponding to the consumed number of units from the subscriber's account In the Rating Control of step 460, the OCF calculates the number of monetary units to deduct from the subscriber's account assisted by the rating entity.

In the Account Control of step 465 the OCF triggers the deduction of the calculated amount from the subscriber's account.

Figure 5:
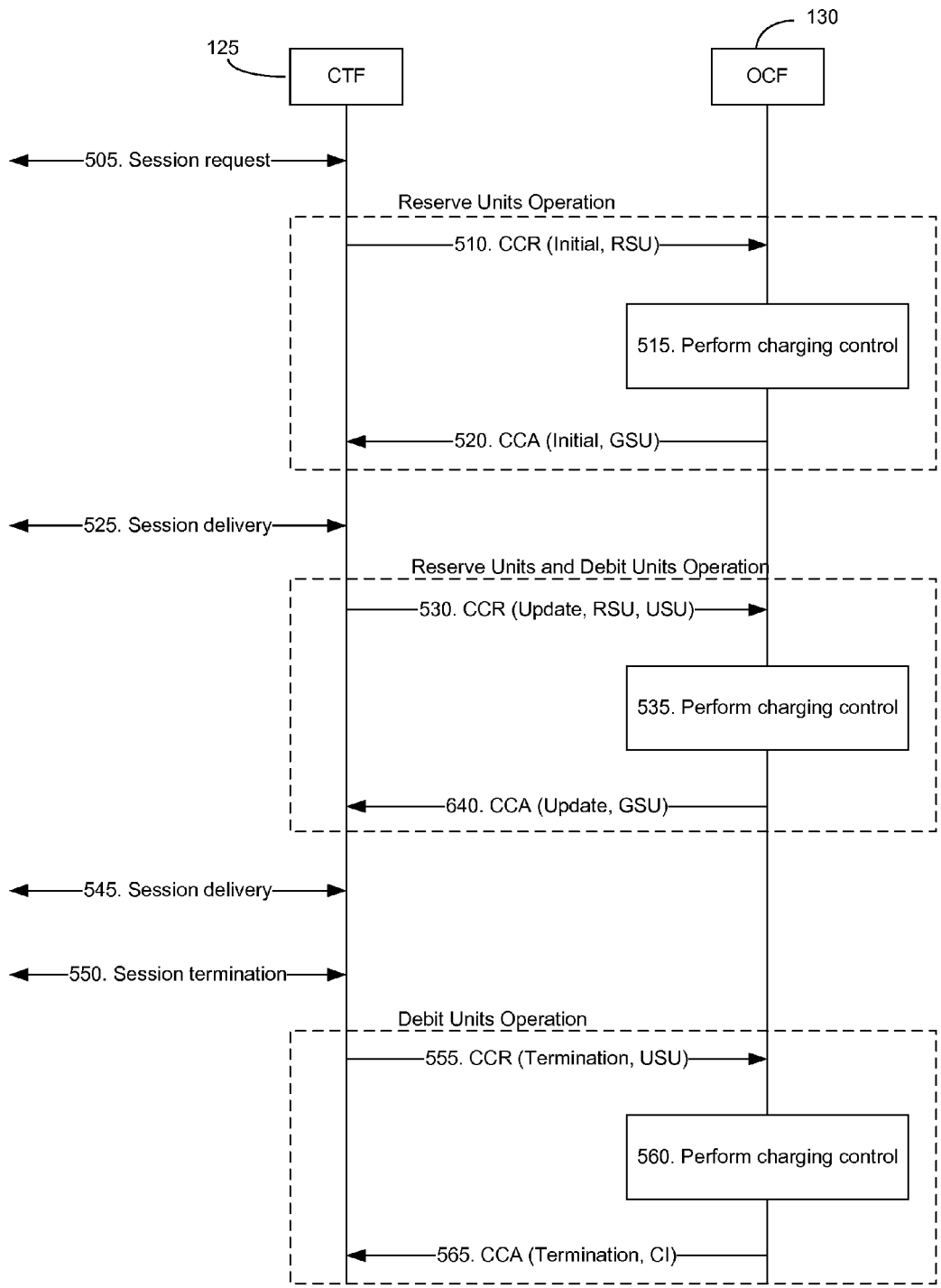
FIG. 5 a message sequence chart showing session charging with unit reservation according to an exemplary embodiment of the invention.

The OCF sends a Debit Units Response message in step 470 wherein the OCF informs the CTF of the actually deducted units. FIG. 5 a message sequence chart showing session charging with unit reservation according to an exemplary embodiment of the invention.

On-line credit control uses two basic logical operations: Debit Units and Reserve Units.

Debit Units Request is sent from CTF to OCF. After receiving a service request from the subscriber, the CTF sends a Debit Units Request to the OCF. The CTF may either specify a service identifier (centralized unit determination) or the number of units requested (decentralized unit determination). For refund purpose, the CTF sends a Debit Units Request to the OCF as well.

Debit Units Response is sent from OCF to CTF. The OCF replies with a Debit Units Response, which informs the CTF of the number of units granted as a result of the Debit Units Request. This includes the case where the number of units granted indicates the permission to render the requested service. For refund purpose, the OCF replies with a Debit Units Response.

Reserve Units Request is sent from CTF to OCF and is a request to reserve a number of units for the service to be provided by an CTF. In case of centralized unit determination, the CTF specifies a service identifier in the Reserve Unit Request, and the OCF determines the number of units requested. In case of decentralized unit determination, the number of units requested is specified by the CTF.

Reserve Units Response is sent from OCF to CTF. The response from the OCF informs the CTF of the number of units that were reserved for as a result of the "Reserve Units Request".

Session charging with unit reservation uses the Session Based Credit Control procedure specified in RFC 4006 by the IETF. In session charging with unit reservation, when the "Debit Units" and "Reserve Units" operations are both needed, they may be combined in one message.

The consumed units are deducted from the subscriber's account after service delivery. Thus, the reserved and consumed units are not necessarily the same. Using this operation, it is also possible for the CTF to modify the current reservation, including the return of previously reserved units.

The corresponding Diameter credit control application DCCA messages for the Debit/Reserve Unit Request operation is Credit-Control-Request (CCR) and for the Debit/Reserve Unit Response operation is Credit-Control-Answer (CCA) as specified in RFC 4006.

The Diameter Credit-Control Application (DCCA) specifies an approach based on a series of "interrogations":

Initial interrogation.
Zero, one or more interim interrogations.
Final interrogation.

In addition to a series of interrogations, also a one time event (interrogation) can be used e.g. in the case when service execution is always successful.

All of these interrogations use Credit-Control-Request CCR and Credit-Control-Answer CCA messages. The Credit-Control-Request for the "interim interrogation" and "final interrogation" reports the actual number of "units" that were used, from what was previously reserved for. This determines the actual amount debited from the subscriber's account.

In step 505 the CTF 125 of a network element receives a session initiation request. The session initiation may be done either by a user equipment or another network element.

In order to perform Reserve Units operation for a number of units (monetary or non-monetary units), the CTF sends a Credit-Control-Request CCR with Credit Control CC-Request-Type set to INITIAL_REQUEST to the OCF 130 of an OCS in step 510. If known, the network element may include Requested-Service-Unit RSU as monetary- or non monetary units (e.g. service units, data volume, time and events) in the request message. The CCR may include a system utilization indicator.

In step 515 a system utilization indicator, either received in the CCR or accessible by the OCF is accessed and used to determine a modifier value for determining a service usage quota. If the service cost information is not received by the OCS, the OCS determines the price of the desired service according to the service specific information received by issuing a rating request to a rating function of the OCS. If the credit balance is sufficient, the OCS reserves the amount corresponding to the modified service usage quota from the users account. If the cost of the service is included in the request, the OCS directly reserves the specified monetary amount modified due to the modified service usage quota.

Once the reservation has been made, the OCS returns Credit-Control-Answer (CCA) message with CC-Request-Type set to INITIAL_REQUEST to the CTF of the network element in step 520 in order to authorize the service execution (Granted-Service-Unit and possibly Cost-Information indicating the cost of the service and Remaining-Balance are included in the Credit-Control-Answer message). The OCS may return a Validity-Time (VT) with value field set to a non-zero value. The OCS may indicate in a Low-Balance-Indication that the subscriber account balance has fallen below a predefined threshold of this account.

Content/service delivery starts in step 525 and the reserved units are concurrently controlled by the CTF.

During session delivery, in order to perform Debit Units and subsequent Reserve Units operations, the network element sends a CCR with CC-Request-Type set to UPDATE_REQUEST, to report the units used and request additional units, respectively, in step 530. The CCR message with CC-Request-Type set to UPDATE_REQUEST is sent by the CTF of the network element between a INITIAL_REQUEST and TERMINATION_REQUEST either on request of the credit control application within the validity time or if the validity time is elapsed. If known, the network element may include Requested-Service-Unit as monetary or non monetary units in the request message. Used-Service-Unit (USU) is complemented in the CCR message to deduct units from both the user's account and the reserved units, respectively. The CCR may include a system utilization indicator.

In step 535 an USU is first analyzed and the amount is deducted from the account. A system utilization indicator, either received in the CCR or accessible by the OCF is accessed and used to determine a modifier value for determining a service usage quota. If the service cost information is not received by the OCS, the OCS determines the price of the desired service according to the service specific information received by issuing a rating request to the Rating Function. If the credit balance is sufficient, the OCS reserves the amount corresponding to the modified service usage quota from the users account. If the cost of the service is included in the request, the OCS directly reserves the specified monetary amount modified due to the modified service usage quota.

Once the deduction and reservation have been made, the OCS returns Credit-Control-Answer message with CC-Request-Type set to UPDATE_REQUEST to the network element in step 540, in order to allow the content/service delivery to continue (new Granted-Service-Unit (GSU) and possibly Cost-Information (CI) indicating the cumulative cost of the service and Remaining-Balance are included in the Credit Control-Answer message). The OCS may include in the CCA message a Final-Unit-Indication (FUI) to indicate the final granted units. The OCS may indicate in a Low-Balance-Indication that the subscriber account balance has fallen below a predefined threshold of this account.

Session delivery continues and the reserved units are concurrently controlled by the CTF in step 545.

The session is terminated at the CTF of the network element in step 550.

The network element sends CCR with CC-Request-Type set to TERMINATION_REQUEST to terminate the active credit control session and report the used units in step 555.

The OCS deducts the amount used from the account. Unused reserved units are released, if applicable, in step 560.

Figure 6:
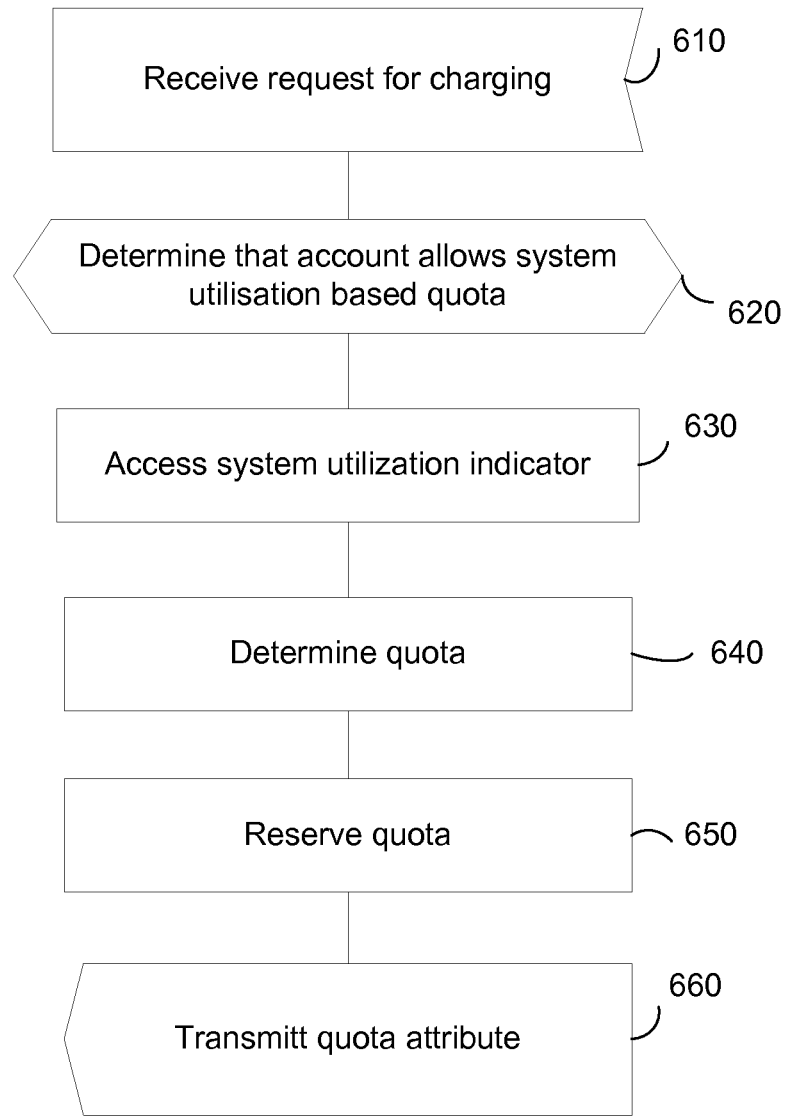
FIG. 6 is a flow chart showing an exemplary embodiment of a method for controlling services in a communication network according to the invention.

The OCS acknowledges the reception of the CCR message by sending CCA message with CC-Request-Type indicating TERMINATION_REQUEST (possibly Cost-Information indicating the cumulative cost of the service and Remaining-Balance are included in the Credit-Control-Answer message) in step 565. FIG. 6 is a flow chart showing an exemplary embodiment of a method for controlling services in a communication network according to the invention.

In step 610 a request message for charging of a service is received in an online charging system from a charging client. The request message is including at least data identifying a first communication network account to charge for the service.

In step 620 it is determined based on account data that the account allows calculating the determined service usage quota attribute based on a system utilization indicator. The determination may be based on any or a combination of an account balance, subscription type, and offers bought.

In step 630 a system utilization indicator is accessed representing a computer resource utilization value of a node involved in providing the service. The system utilization indicator may represents computer resource utilization value of a node of the OCS or it may represent a computer resource utilization value of a node of the charging client, e.g. network element or node including the CTF. The request message in step 610 may further includes the system utilization indicator. The system utilization indicator may represent any or a combination of requests received per time unit, CPU usage, memory usage, power consumption, a degree of physical hardware failures or system utilization during a previous time segment.

In step 640 it is determined based on at least the system utilization indicator a determined service usage quota, including a determined service usage quota attribute, to be reserved for from the account. In one example the request message for charging in step 610 further comprises an attribute of a requested service usage quota and the determining of a determined service usage quota attribute further comprises replacing the attribute of the requested service usage quota with the determined service usage quota attribute. In a further example the step of determining the determined service usage quota attribute of a service usage quota reserved for from the account involves setting the service usage quota attribute value such that the time between request messages for charging of the service from the charging client is decreased when the load indicator is above a first threshold value and is increased when the load indicator is below a second threshold value. The determined service usage quota attribute may be a quota size for example time, volume, number of events and/or a validity time of the quota.

In step 650 the service usage quota is reserved for from the account. The reservation may be done by removing a monetary amount corresponding to the determined service usage quota from the communication network account. The reservation may also be done by marking the monetary amount corresponding to the determined service usage quota as not available for reservation by subsequent charging request messages. The amount corresponding to the determined service usage quota can be determined by rating of the determined service usage quota.

Figure 7:
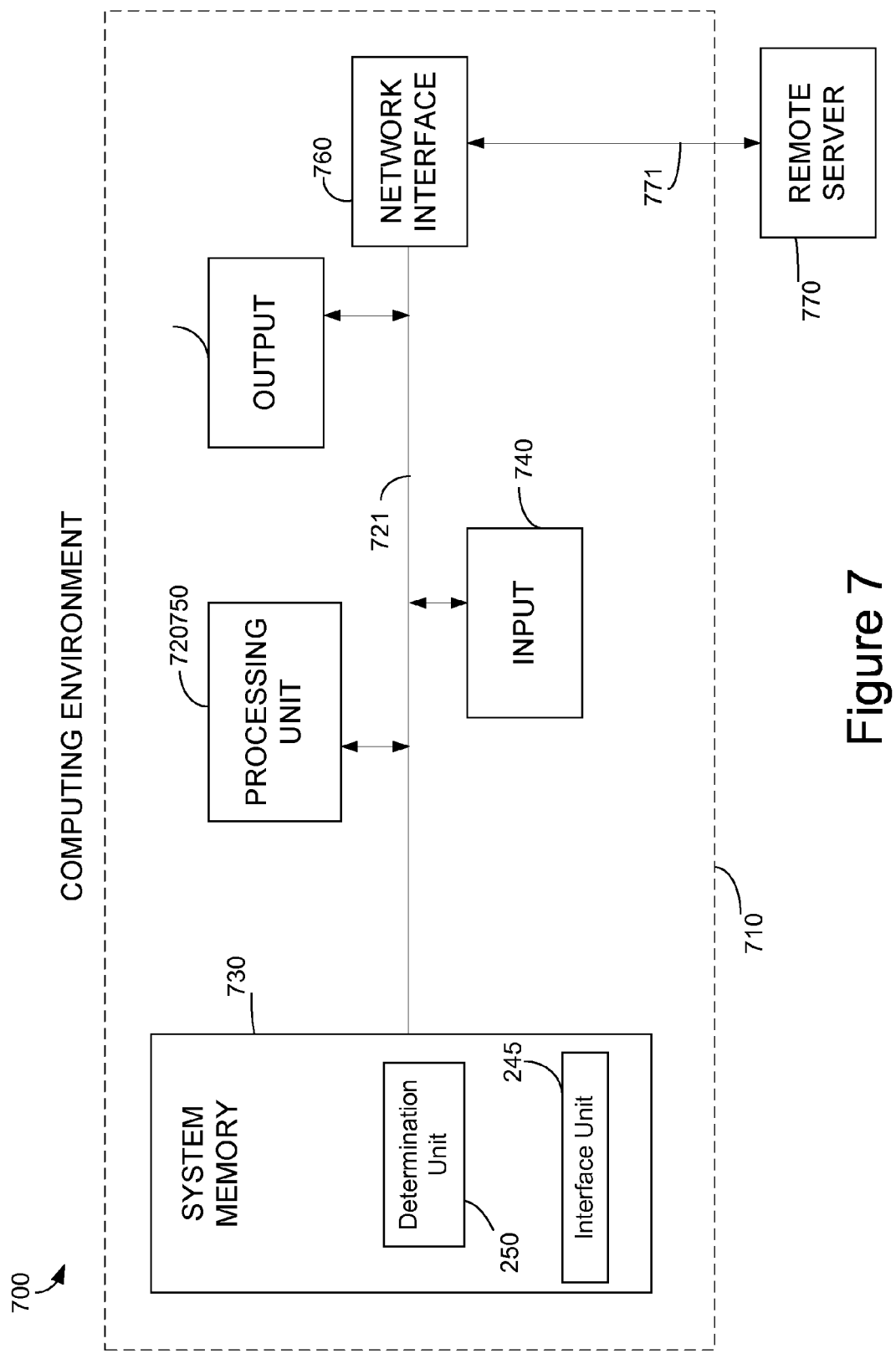
FIG. 7 is a block diagram showing an exemplary embodiment of an Online Credit Control system for controlling charging of a service in a communication network in the form of a computing system environment.

In step 660 an answer message is transmitted to the charging client including the determined service usage quota attribute of the service usage quota reserved for from the account to be applied in controlling the service. FIG. 7 is a block diagram showing an exemplary embodiment of an Online Credit Control system OCS for controlling charging of a service in a communication network in the form of a computing system environment 700. Although as made clear above, the computing system environment 700 is only one example of a suitable computing environment for an OCS and is not intended to suggest any limitation as to the scope of use or functionality of the claimed subject matter. Further, the computing environment 700 is not intended to suggest any dependency or requirement relating to the claimed subject matter and any one or combination of components illustrated in the example operating environment 700.

An example of a device for implementing the previously described innovation includes a general purpose computing device in the form of a computer 710. Components of computer 710 can include, but are not limited to, a processing unit 720, a system memory 730, and a system bus 721 that couples various system components including the system memory to the processing unit 720. The system bus 721 can be any of several types of bus structures including a memory bus or memory controller, a peripheral bus, and a local bus using any of a variety of bus architectures.

Computer 710 can include a variety of computer readable media. Computer readable media can be any available media that can be accessed by computer 710. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media can embody computer readable instructions, data structures, program modules or other data in a modulated data signal such as a carrier wave or other transport mechanism and can include any suitable information delivery media.

The system memory 730 can include computer storage media in the form of volatile and/or nonvolatile memory such as read only memory (ROM) and/or random access memory (RAM). A basic input/output system (BIOS), containing the basic routines that help to transfer information between elements within computer 710, such as during start-up, can be stored in memory 730. Memory 730 can also contain data and/or program modules that are immediately accessible to and/or presently being operated on by processing unit 720. By way of non-limiting example, memory 730 can also include an operating system, application programs, other program modules, and program data.

In one embodiment the Interface Unit 245 is a software module loaded in the memory and processable by the processing unit, adapting the OCS for receiving a request message for charging of a service from a charging client, the request message including at least data identifying a first communication network account to charge for the service, and the Determination Unit 250 is a software module loaded in the memory and processable by the processing unit adapting the OCS for:

(i) accessing a system utilization indicator representing a computer resource utilization value of a node involved in providing the service;

(ii) determining based on at least the system utilization indicator a determined service usage quota, including a determined service usage quota attribute, to be reserved for from the account;

(iii) reserving for the service usage quota from the account. The interface unit software module further adapting the OCS for transmitting an answer message to the charging client including the determined service usage quota attribute of the service usage quota reserved for from the account to be applied in controlling the service.

The computer 710 can also include other removable/non-removable and volatile/nonvolatile computer storage media. For example, computer 710 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 721 through a non-removable memory interface such as an interface, and a magnetic disk drive or optical disk drive can be connected to the system bus 721 by a removable memory interface, such as an interface.

A user can enter commands and information into the computer 710 through input devices such as a keyboard or a pointing device such as a mouse, trackball, touch pad, and/or other pointing device. Other input devices can include a microphone, joystick, game pad, satellite dish, scanner, or similar devices. These and/or other input devices can be connected to the processing unit 720 through user input 740 and associated interface(s) that are coupled to the system bus 721, but can be connected by other interface and bus structures, such as a parallel port, game port or a universal serial bus (USB).

A graphics subsystem can also be connected to the system bus 721. In addition, a monitor or other type of display device can be connected to the system bus 721 through an interface, such as output interface 750, which can in turn communicate with video memory. In addition to a monitor, computers can also include other peripheral output devices, such as speakers and/or printing devices, which can also be connected through output interface 750.

The computer 710 can operate in a networked or distributed environment using logical connections to one or more other remote computers, such as remote server 770, which can in turn have media capabilities different from device 710. The remote server 770 can be a personal computer, a server, a router, a network PC, a peer device or other common network node, and/or any other remote media consumption or transmission device, and can include any or all of the elements described above relative to the computer 710. The logical connections depicted in FIG. 7 include a network 771, such as a local area network (LAN) or a wide area network (WAN), but can also include other networks/buses.

When used in a LAN networking environment, the computer 710 is connected to the LAN 771 through a network interface or adapter. When used in a WAN networking environment, the computer 710 can include a communications component, such as a modem, or other means for establishing communications over a WAN, such as the Internet. A communications component, such as a modem, which can be internal or external, can be connected to the system bus 721 through the user input interface at input 740 and/or other appropriate mechanism.

In a networked environment, program modules depicted relative to the computer 710, or portions thereof, can be stored in a remote memory storage device. It should be noted that the network connections shown and described are exemplary and other means of establishing a communications link between the computers can be used.

Additionally, it should be noted that as used in this application, terms such as "component," "display," "interface," and other similar terms are intended to refer to a computing device, either hardware, a combination of hardware and software, software, or software in execution as applied to a computing device. For example, a component may be, but is not limited to being, a process running on a processor, a processor, an object, an executable, a thread of execution, a program and a computing device. As an example, both an application running on a computing device and the computing device can be components. One or more components can reside within a process and/or thread of execution and a component can be localized on one computing device and/or distributed between two or more computing devices, and/or communicatively connected modules. Further, it should be noted that as used in this application, terms such as "system user," "user," and similar terms are intended to refer to the person operating the computing device referenced above.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various exemplary combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method, performed by an Online Charging System (OCS), for controlling an amount of signaling between the OCS and a node involved in providing a service in a communication network, comprising the steps of:
    the OCS accessing a system utilization indicator representing computer resource utilization of the node involved in providing the service;
    the OCS determining, based on at least the system utilization indicator, a service usage quota, including a determined service usage quota attribute that indicates how many units of service usage or resource usage the service is authorized to consume before the node has to send a report to the OCS,
    wherein the system utilization indicator represents one or more of: requests received per time unit, CPU usage, memory usage, power consumption, a degree of physical hardware failures or warnings, and system utilization during a previous time segment;
    the OCS reserving, for the service, the units of service usage or resource usage indicated in the service usage quota; and
    the OCS transmitting an answer message to a charging client including the determined service usage quota attribute of the service usage quota to be applied in controlling the service, to affect an amount of signaling between the OCS and the node involved in providing the service.

2. The method according to claim 1, wherein the node is a node of the OCS, and wherein the system utilization indicator represents a computer resource utilization value of the node.

3. The method according to claim 1, further comprising the OCS receiving a request message for charging of the service from the charging client, the request message including at least data identifying a first communication network account to charge for the service, wherein the node is a node of the charging client, and wherein the system utilization indicator represents a computer resource utilization value of the node, and the request message further includes the system utilization indicator.

4. The method according to claim 3, wherein the request message for charging further comprises an attribute of a requested service usage quota and the step of determining the service usage quota attribute further comprises replacing the attribute of the requested service usage quota with the determined service usage quota attribute.

5. The method according to claim 3, wherein the step of determining the service usage quota attribute of the service usage quota reserved for from a communication network account includes setting the service usage quota attribute value such that the time between request messages for charging of the service from the charging client is decreased when the system utilization indicator is above a first threshold value and is increased when the system utilization indicator is below a second threshold value.

6. The method according to claim 1, wherein the determined service usage quota attribute is one or more of a service usage quota size and a validity time of the service usage quota.

7. The method according to claim 3, wherein after the step of receiving a request for charging of a service, further performing the step of determining, based on account data, that the account allows calculating the determined service usage quota attribute based on the system utilization indicator.

8. The method according to claim 7 wherein the step of determining, based on account data, that the account allows calculating the determined service usage quota attribute based on the system utilization indicator is based on one or more of an account balance, subscription type, and offers bought.

9. An online credit control system for controlling an amount of signaling between the system and a node involved in providing a service in a communication network, the system comprising:
    a determination unit configured for:
        (i) accessing a system utilization indicator representing computer resource utilization of the node involved in providing the service;
        (ii) determining, based on at least the system utilization indicator, a determined service usage quota, including a determined service usage quota attribute that indicates how many units of service usage or resource usage the service is authorized to consume before the node has to send a report to the system, wherein the system utilization indicator represents one or more of: requests received per time unit, CPU usage, memory usage, power consumption, a degree of physical hardware failures or warnings, and system utilization during a previous time segment;
        (iii) reserving, for the service, the units of service usage or resource usage indicated in the service usage quota; and
    an interface unit configured for transmitting an answer message to a charging client including the determined service usage quota attribute of the service usage quota to be applied in controlling the service, to affect an amount of signaling between the OCS and the node involved in providing the service.

10. The online credit control system according to claim 9, wherein the node is a node of the system, and the system utilization indicator represents a computer resource utilization value of the node.

11. The online credit control system according to claim 9, wherein the interface unit is configured for receiving a request message for charging of the service from the charging client, the request message including at least data identifying a first communication network account to charge for the service, wherein the node is a node of the charging client, wherein the system utilization indicator represents a computer resource utilization value of the node, and the request message further includes the system utilization indicator.

12. The online credit control system according to claim 11, wherein the request message for charging further comprises an attribute of a requested service usage quota and the determining the service usage quota attribute further comprises replacing the attribute of the requested service usage quota with the determined service usage quota attribute.

13. The online credit control system according to claim 11, wherein determining the service usage quota attribute of the service usage quota reserved for from a communication network account includes setting the service usage quota attribute value such that the time between request messages for charging of the service from the charging client is decreased when the system utilization indicator is above a first threshold value and is increased when the system utilization indicator is below a second threshold value.

14. The online credit control system according to claim 9, wherein the determined quota attribute is one or more of a quota size and a validity time of the service usage quota.

15. The online credit control system according to claim 11, wherein the determination unit is further adapted to determine, based on account data, that the account allows calculating the determined service usage quota attribute based on the system utilization indicator.

16. The online credit control system according to claim 15, wherein the determination unit is further adapted to determine, based on account data, that the account allows determining the service usage quota attribute based on the system utilization indicator based on one or more of an account balance, subscription type, and offers bought.

17. The method of claim 1, wherein the request message is received over the communication network.

18. The method of claim 1, further comprising the OCS receiving a request that identifies a requested number of units of service usage or resource usage for use by the charging client, wherein determining the service usage quota attribute comprises: (i) determining a modification factor based on the system utilization indicator, and (ii) multiplying the modification factor by the requested number of units of service usage or resource usage.

* * * * *